US006312807B1

(12) United States Patent
Ludwig et al.

(10) Patent No.: US 6,312,807 B1
(45) Date of Patent: Nov. 6, 2001

(54) UV-ABSORBING CORE/SHELL PARTICLES

(75) Inventors: Bret W. Ludwig, Oakdale; Gilbert L. Eian, Mahtomedi, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/371,064

(22) Filed: Aug. 9, 1999

(51) Int. Cl.$^7$ ........................................ B32B 5/16
(52) U.S. Cl. .............................. 428/403; 428/407
(58) Field of Search ..................... 428/403, 407

(56) References Cited

U.S. PATENT DOCUMENTS

| | | |
|---|---|---|
| 4,419,471 | 12/1983 | Nelsen et al. . |
| 4,528,311 | 7/1985 | Beard et al. ............................ 524/91 |
| 4,624,973 * | 11/1986 | Kuwajima et al. .................. 523/221 |
| 4,952,455 | 8/1990 | Siol et al. . |
| 5,010,121 | 4/1991 | Yeates et al. ........................ 523/336 |
| 5,061,558 * | 10/1991 | Fischer et al. ....................... 428/332 |
| 5,207,954 | 5/1993 | Lewis et al. ........................... 264/13 |
| 5,237,004 | 8/1993 | Wu et al. . |
| 5,372,922 | 12/1994 | Schofield et al. ................... 430/572 |
| 5,461,125 | 10/1995 | Lu et al. ............................... 525/293 |
| 5,629,365 | 5/1997 | Razavi .................................... 524/37 |
| 5,646,201 | 7/1997 | Araki et al. ......................... 523/201 |
| 5,712,335 | 1/1998 | Tsuda et al. ......................... 524/269 |
| 5,756,273 * | 5/1998 | Wang et al. ......................... 430/537 |
| 6,251,521 * | 6/2001 | Eian et al. ....................... 428/402.21 |

FOREIGN PATENT DOCUMENTS

| | | | |
|---|---|---|---|
| 3 837 588 | 5/1990 | (DE) | ............................ C08J/007/04 |
| 0 788 029 | 8/1997 | (EP) | ................................ G03F/3/10 |
| 0 875 544 A | 11/1998 | (EP) | . |
| 0 131 468 | 1/1999 | (EP) | ............................... C08F/20/36 |
| 54-003129 | 1/1979 | (JP) | ............................ C08F/008/00 |
| 62-093220 | 4/1987 | (JP) | ............................ A61K/007/42 |
| 62-095301 | 5/1987 | (JP) | ............................ C08F/002/22 |
| 04-213348 | 8/1992 | (JP) | ............................ C08L/033/08 |
| 05-184090 | 7/1993 | (JP) | ............................ H02K/003/04 |
| 05-230701 | 9/1993 | (JP) | ............................ A41B/011/00 |
| 06-032961 | 2/1994 | (JP) | ............................... C08L/061/00 |
| 06-073368 | 3/1994 | (JP) | ............................... C09K/003/00 |
| 07-188587 | 7/1995 | (JP) | ............................... C09D/005/03 |
| 07/291837 | 11/1995 | (JP) | ............................... A61K/007/02 |
| 08-193180 | 7/1996 | (JP) | ............................... C09D/133/06 |
| 09-255936 | 9/1997 | (JP) | ............................... C09K/003/00 |
| 10-001587 | 1/1998 | (JP) | ............................... C08L/029/04 |
| 10-045854 | 2/1998 | (JP) | ............................... C08F/285/00 |
| 10-120857 | 5/1998 | (JP) | ............................... C08L/027/12 |
| WO 98/18569 | 5/1998 | (WO) | ............................... B05D/7/04 |
| WO 99/03900 | 1/1999 | (WO) | ............................... C08F/8/00 |

OTHER PUBLICATIONS

J. F. Rabek, "Photostabilization of Polymers," pp. 203–242 (1990).
Segall et al., Core–Shell Structured Latex Particles. II Synthesis and Characterization of Poly(n–butyl acrylate)/Poly(benzyl methacrylate–styrene) Structured Latex Particles, J. Applied Polymer Science, vol. 58, pp. 401–417 (1995).
Encyclopedia of Polymer Science and Engineering, vol. 3, pp. 758–759 (1988).
"Organic Coatings" Science and Technology, Wicks, Jones, and Pappas, pp. 35–48 (1992).
Encyclopedia of Polymer Science and Engineering, Supplement vol., pp. 53–59 (1989).
Valet, "Light Stabilizers for Paints," Vincentz Verlag, Hannover, Germany, pp. 18–55 (1997).
Nicholas P. Liberto, "Powder Coating," Powder Coating Institute, Chapter 10 (1994).
J.F. Rabek, "Photostabilization of Polymers," pp. 368–391 (1990).
Zhang et al., "Preparation and Structure Control of poly(butylacrylate)/poly(methyl methacrylate) core/shell impact modifier," Department of Chemical Engineering, Jilin Institute of Technology, Changchun, 130012, Peop. Rep. China. Yingyong Huaxue (1997), 14(3), 93–95. Coden: Yihued; Issn: 1000–0518. Journal written in Chinese. Can 127:136319.

* cited by examiner

*Primary Examiner*—Hoa T. Le
(74) *Attorney, Agent, or Firm*—Kimberly S. Zillig

(57) ABSTRACT

Described are polymeric core/shell particles wherein the core comprises a ultraviolet absorber.

8 Claims, 2 Drawing Sheets

UV-ABSORBING CORE/SHELL PARTICLES

FIELD OF THE INVENTION

The invention contemplates polymeric particles having a core/shell structure, wherein the core comprises ultraviolet absorber.

BACKGROUND

Ultraviolet radiation (UV) can cause degradation of certain materials if exposed. Chemical materials known as ultraviolet absorbers, or UVAs, can be used to protect materials from the damaging effects of UV radiation. A UVA can be incorporated into a material to protect that material from UV radiation, or, a composition that contains UVA can be applied to a UV-sensitive substrate to protect the substrate.

Protective coating compositions, sometimes referred to as "topcoats," can be applied to outdoor-durable materials such as signs based on flexible substrates and optionally having applied graphics, where the coating functions to inhibit dirt buildup or dirt penetration, as a barrier to water, to prevent plasticizers or other ingredients from migrating out of the substrate, or to allow ease of cleaning. A topcoat can include polymeric materials (e.g., a fluoropolymer to provide dirt resistance or cleanability), as well as stabilizers to protect the topcoat or the substrate from degradation, e.g., due to UV radiation. Degradation may involve yellowing, embrittlement, or loss of clarity, gloss, or water resistance.

Unfortunately, while it can be desirable to incorporate a UVA into a protective coating, UVAs can cause some difficult problems. One problem is the relative impermanence of UVAs in many chemical compositions. Non-reactive UVAs can be included in a chemical composition as a dispersed compound, not chemically attached to any other component. These UVAs can be lost from a composition by volatilization during processing (e.g., drying), or by otherwise migrating to the surface of a composition followed by removal as dust or wash off. Loss of the UVA leaves the composition and its substrate less protected from ultraviolet radiation, allowing UV radiation to degrade the composition or substrate. One imperfect remedy to this problem is to include larger amounts of UVA in a composition.

A further problem with UVAs is that they can be incompatible with different polymeric materials (e.g., fluoropolymers). This incompatibility can lead to instability (e.g., thermodynamic instability) or water sensitivity of the composition, which can cause a loss of physical or optical properties, including loss of clarity or increased fogginess. Incompatibility can also cause increased or accelerated loss of UVA by migration, bleeding, or blooming.

Attempts to incorporate UVAs into chemical compositions such as topcoats have been met with a variety of frustrating results, especially when the composition includes an ingredient that is incompatible with the UVA, as are many fluoropolymers. There is a general need to identify ultraviolet absorbing materials and compositions and also, to identify materials that can be used to prepare UV-absorbing compositions such as films and coatings.

SUMMARY OF THE INVENTION

The invention provides ultraviolet radiation absorbing polymeric particles, wherein the particles have a core/shell structure, and wherein the polymeric core phase includes ultraviolet absorber.

An aspect of the invention relates to polymeric particles having a core/shell structure, wherein the core comprises an ultraviolet absorber and a core polymer and the core polymer is prepared from core monomers including ethyl acrylate. Preferably the core monomers further include methyl methacrylate, and the core polymer can optionally be crosslinked. The UVA may be chemically incorporated into or otherwise attached to the core polymer, or the UVA may be dispersed within the core polymer.

As used herein, the following terms shall be given the recited meanings:

The term "thermoplastic" means materials that soften or flow upon exposure to heat and/or pressure. Thermoplastic is contrasted with "thermoset," which describes materials that react irreversibly upon heating so that subsequent applications of heat and pressure do not cause them to soften or flow.

"(Meth)acrylate" means either acrylate or methacrylate.

DETAILED DESCRIPTION

Figure 1:
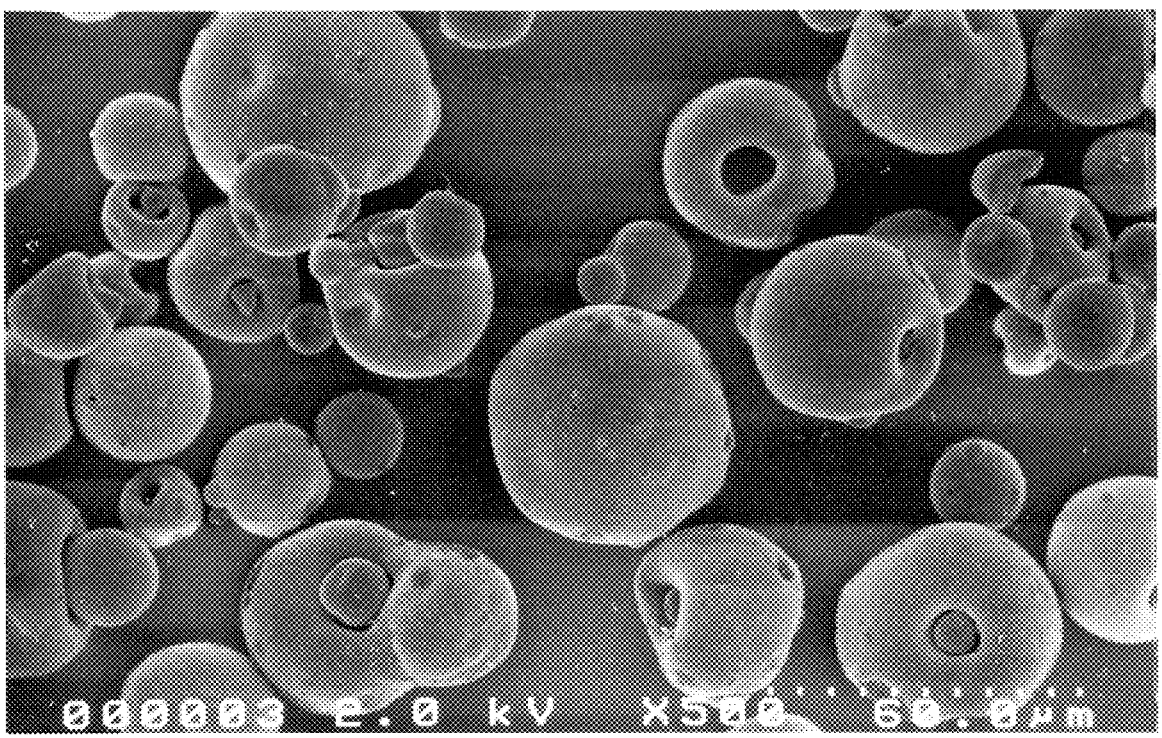
FIG. 1 is an SEM photomicrograph at 2.0 kv×500 magnification of agglomerate particles prepared by spray drying a latex containing core/shell particles and fluoropolymer particles.
Figure 2:
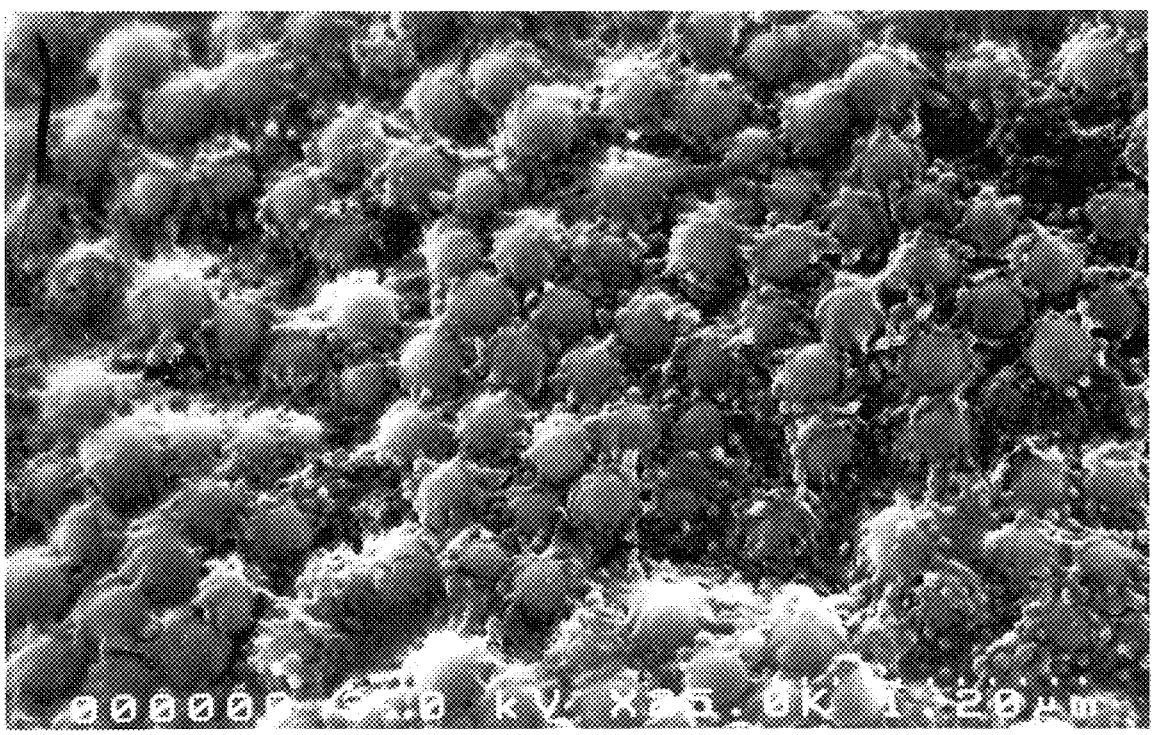
FIG. 2 is an SEM photo at 3.0 kv×25.0 K magnification containing the surface of agglomerate particles prepared by spray drying a latex of core/shell particles and fluoropolymer particles.

Polymeric core/shell particles of the invention exhibit a core/shell structure, meaning the particles comprise a polymeric core and a polymeric shell. The polymeric core comprises core polymer and ultraviolet absorber (UVA) which may or may not be chemically incorporated into the core polymer. (The polymeric core can include additional non-polymeric materials, and may be referred to herein as the "core" or "core particle.")

The core polymer can be chosen to be useful for a specific application of the core/shell particle to provide various physical, chemical, or mechanical properties. The core polymer can be chosen to be a relatively soft or rubbery material, e.g., having a glass transition temperature (Tg) of 40 degrees Celsius (40 C.) or lower. A soft or rubbery core polymer may impart flexibility to a core/shell particle or a composition containing or derived from the core/shell particle. Optionally, the core polymer may be crosslinked. The core polymer can be crosslinked to prevent breakage or disruption of the core particle during processing, e.g., to a film or coating, which could cause core material to be present at the surface of the film or coating.

The core polymer can comprise monomeric units derived from one or more reactive monomers or comonomers (referred to collectively herein as the "core monomer" or "core monomers"). The core polymer can be prepared from core monomers which will provide a soft and rubbery core particle, e.g., having a Tg less than 40° C. Useful monomers include acrylate esters, e.g., up to C12 acrylate esters. A preferred core monomer is ethyl acrylate, which can be copolymerized with a (meth)acrylate-functional UVA.

The core monomer can additionally include any reactive compound (e.g., monomer, dimer, trimer, oligomer, prepolymer, polymer, etc.) capable of forming a useful core polymer (meaning a homopolymer or a copolymer). Examples of additional core monomers include monofunctional reactive compounds comprising unsaturated moieties such as vinyls, e.g., (meth)acrylates, with lower (meth)

acrylates being preferred. Specific examples include butyl acrylate, hexyl acrylate, octyl acrylate, decyl acrylate, and butyl methacrylate.

The core monomer can include multi-functional reactive compounds having suitable reactive moities, e.g., two, three, or more reactive moieties such as vinyls, (meth)acrylates, epoxies, alcohols, isocyanates, etc. Such multi-functional compounds (sometimes referred to or used as crosslinkers) are known in the art of polymer chemistry, and useful examples include but are not limited to multi-functional vinyl compounds such as multifunctional (meth)acrylate compounds, multifunctional styrenes, and multifunctional allyl compounds, specifically including allyl acrylate, allyl methacrylate (AMA), butanediol diacrylate (BDDA), and hexanediol diacrylate (HDDA).

Ultraviolet radiation absorbers, UVAs, are known and commercially available chemical materials which absorb ultraviolet radiation. See, e.g., Rabek, J. F., *Photostabilization of Polymers,* 203–42 (1990), incorporated herein by reference. A variety of UVAs are known and commercially available, and can be prepared by known methods. See id. A UVA can preferably be soluble in a core polymer, and can be chosen to have desired UV-absorption properties for a given application of the core/shell particles. Examples of UVAs include benzophenones, benzotriazoles, triazines, cinnamates, cyanoacrylates, dicyano ethylenes, and para-aminobenzoates.

The UVA can be included in, contained by, or attached to the core particle in any configuration, and in any chemical or physical manner. A UVA can be a relatively low molecular weight compound dispersed in, not chemically attached to, the core polymer. Such dispersible UVAs are commercially available, with a single example being TINUVIN 1130, from Ciba Specialties Corp.

Optionally, a UVA can be functionalized with one or more reactive moieties to provide a reactive, monomeric UVA which can be included in and reacted with the core monomer to become chemically incorporated into the core polymer as a monomeric unit of the backbone or as a group pendant from the core polymer. Suitable reactive moieties include unsaturated moieties such as vinyls, e.g., (meth)acrylate and styrene, or other useful reactive moieties such as alcohols, isocyanates, epoxies, etc. Specific examples of functionalized UVAs include (meth)acrylate-functionalized UVAs such as (meth)acrylate-functional benzotriazoles and benzophenones. These compounds are well known, can be prepared by known methods, and are commercially available, e.g., NORBLOC UVAs such as NORBLOC 7966.

A core particle can be prepared from any useful amounts of various core monomers, reactive (monomeric) UVA, non-reactive (dispersible) UVA, and crosslinker. Useful amounts of these different ingredients can be from about 50 to 98 parts by weight core monomer based on the total weight of the core particle, preferably from about 65 to 95 parts by weight, and more preferably from about 75 to 90 parts by weight core monomer (for purposes of these ranges the monomer does not include reactive (monomeric) UVA), and up to about 5 weight percent crosslinker, preferably from about 0.1 to 3 weight percent crosslinker, e.g., from about 0.2 to about 2 weight percent crosslinker, based on the total weight of the core particle. The amount of UVA included in a core particle can be any useful amount, depending on factors such as the chemistry of the UVA, the substrate, the core monomer, etc. In general, UVA can be included in a core particle in an amount in the range from about 2 to 50 parts by weight UVA based on the total weight of the core particle, preferably from about 5 to 35 parts by weight UVA, and more preferably from about 10 to 25 parts by weight; these ranges are the same whether the UVA is monomeric, i.e., reactive with the core monomer, or non-reactive.

The polymeric shell takes the form of a polymeric material disposed on the core, preferably completely surrounding (e.g., encapsulating) the core. Still, it is possible for production processes to result in particles wherein the polymeric shell does not completely surround the core, but only partially covers the core, leaving a portion of the core exposed.

The polymeric shell comprises a polymeric material (shell polymer) useful for a chosen core/shell particle and application, to provide desired physical, mechanical, or chemical properties. The shell polymer may be chosen to be a thermoplastic polymer such as one having a Tg sufficiently high to yield a powder composition that flows freely, without particles substantially gumming or clinging together, but still low enough that the core/shell particles and compositions or products containing or derived from the core/shell particles can be suitable for processing and will exhibit useful chemical, physical, and mechanical properties. The shell polymer can also be sufficiently hard (e.g., have a sufficiently high Tg) to exhibit dirt resistance and cleanability properties.

The polymeric shell, or components thereof, may be either compatible or incompatible with the core particle, while preferably exhibiting a useful level of adherence to the core. The ingredients of the polymeric shell may be chosen based on compatibility, incompatibility, processability, or other considerations with respect to other materials with which the core/shell particles may be intended for use (e.g., mixed with, coated on, or otherwise associated with).

Monomers used to prepare the shell polymer (shell monomers) can be chosen to provide a polymeric shell having desired physical properties such as hardness or softness, or compatibility or cleanability properties, and can be chosen to be thermoplastic, thermosetting or crosslinked. Preferred shell monomers can include (meth)acrylate monomers such as methyl methacrylate (MMA), methyl acrylate, ethyl methacrylate, ethyl acrylate (EA), and mixtures of these. Particularly preferred shell monomers include MMA and EA.

Selected shell monomers can be included in a shell polymer in a variety of useful amounts, with preferred amounts of methyl methylacrylate and ethyl acrylate being in the range from 70:30 to 95:5 (A:EA) (by weight), more preferably in the range from about 80:20 to 90:10, MMA:EA.

The amounts (by weight) of core particle and polymeric shell in a core/shell particle can be any amounts of each which are found to be useful for a particular application, and to provide desired physical or mechanical properties such as flexibility or cleanability of a core/shell particle containing composition. An exemplary range can be from about 1:1 to 1:9 parts by weight core particle per parts by weight polymeric shell (core:shell). Preferred amounts of core particle to polymeric shell can be in the range from about 30:70 to 15:85.

Polymeric core/shell particles can be prepared from the above-described materials, by methods known in the polymer art. The chosen method can depend on a number of factors including the identity of the core and shell monomers, whether the UVA is non-reactive and therefore will be dispersed in the core polymer or reactive and will be an attached chemical component of the core polymer, or whether the core polymer or polymeric shell is thermoplastic, thermosetting, or crosslinked. Examples of suitable methods include those described, e.g., in U.S. Pat. No. 5,461,125 (Lu et al.), and Segall et al., *Core-Shell Structured Latex Particles. II. Synthesis and Characterization of Poly(n-butyl acrylate)/Poly(benzyl methacrylate-styrene) Structured Latex Particles,* J. Applied Poly Sci. 58, 401–417 (1995), incorporated herein by reference.

Specifically, the core/shell particles can be prepared by semi-continuous or two-stage emulsion polymerization methods, wherein a first polymerization produces a core particle comprising the UVA, and by a second polymerization a polymeric shell is formed on the core.

Preferred methods for preparing core/shell particles can produce an aqueous latex comprising a dispersion of core/shell particles in water. The core/shell particles can be present in a range of differently shaped and sized particles, typically having an average (mean) size (diameter) in the range from about 40 to 200 nanometers. The size of core/shell particles can be measured by known analytical methods, for example by light scattering methods using a light scattering apparatus, such as a COULTER N4 MD submicron particle analyzer.

The core/shell particles can be processed or used to form a variety of UV-absorbing materials. See, e.g., Applicants' copending U.S. patent application, entitled Polymeric Compositions, U.S. Ser. No. 09/371,070 and the application entitled Multi-Layer Articles Including UV-Absorbing Polymeric Compositions, U.S. Ser. No. 09/371,060, each filed on even date herewith, and each being fully incorporated herein by reference.

EXAMPLES

Example 1
Preparation of a Polymeric UV Absorber (UVA) Having a Core/shell Structure This example details preparation of a latex particle having a 30/70 core/shell ratio with the core composition being 17/83 Norbloc™ 7966/ethyl acrylate and the shell composition being 80/20 methyl methacrylate/ethyl acrylate. Water (331.4 g), sodium lauryl sulfate (1.5 g), isooctyl thioglycolate (0.45 g), and a mixture (premix) of ethyl acrylate (37.5 g) and Norbloc™ 7966 (7.5 g) a polymerizable UV absorber (available from Janssen Pharmaceutica, Titusville, N.J.) were charged to a reaction flask, stirred and purged with nitrogen while heating to 85–90° C. When the system was well dispersed, the batch was cooled to 75° C. and a premix of potassium persulfate initiator (0.45 g) in water (17.55 g) was added. After an initial induction period, the polymerization started and the batch temperature rose to about 80° C. After the peak temperature had been reached (about 5 to 10 minutes), the shell monomer premix consisting of methyl methacrylate (84 g), ethyl acrylate (21 g) and isooctyl thioglycolate (0.53 g) was added over about 90 minutes while the batch temperature was held at 80° C. When addition was complete, the batch was held at 80° C. for 90 minutes then cooled and filtered through cheesecloth.

The product had inherent viscosity of 0.36 deciliter per gram (dl/g) measured in tetrahydrofuran solvent. Analysis of the dried polymer by differential scanning calorimetry showed two separate glass transitions at −6° C. and 70° C.

Example 2
Preparation of a Polymeric UV Absorber (UVA) Having a Core/shell Structure and a Crosslinked Core A latex with 20/80 core/shell ratio was prepared by the procedure of Example 1 above, modified as follows. The core composition was prepared using 0.45 g allyl methacrylate, 5.01 g NORBLOC™ 7966, 24.54 g ethyl acrylate, and 0.20 g isooctyl thioglycolate. The shell monomers included 102 g methyl methacrylate, 18 g ethyl acrylate and 0.78 g isooctyl thioglycolate. The shell monomer mixture was added over a period of 90 minutes. The product had IV=0.30 dl/g and a single glass transition temperature at 82° C. The addition of allyl methacrylate to the core resulted in crosslinking of the core and disappearance of the lower Tg that was noted in Example 1.

Examples 3 and 4
Preparation of Core/Shell Latices With Alternative Polymerizable UV Absorbers Latices with a 30/70 core/shell ratio were prepared by the procedure outlined in Example 1, modified as follows. The core compositions for these examples were prepared from polymerizable UVA and ethyl acrylate in a weight ratio of 16.7/83.3, and the shell polymer was prepared from methyl methacrylate/ethyl acrylate in a weight ratio of 80/20. The shell monomer mixture for both Example 3 and 4 contained 84 g methyl methacrylate, 21 g ethyl acrylate and 0.53 g isooctyl thioglycolate.

The core monomer mixture of Example 3 contained 37.5 g ethyl acrylate, 7.5 g CGL 104, a polymerizable benzotriazole available from Ciba Specialty Chemicals, and 0.45 g isooctyl thioglycolate. The product had IV=0.38 dl/g and showed two glass transition temperatures at −2° C. and 73° C.

In example 4, Cyasorb™ 416, a polymerizable benzophenone UV absorber available from Cytec, was substituted for the CGL 104 used in Example 3. The product had IV=0.18 dl/g and showed two glass transition temperatures at 1° C. and 73° C.

Example 5
Non Polymerizable UVA in Core/shell Particle Having a Crosslinked Core A latex with a crosslinked core containing a non polymerizable UVA was prepared using the procedure of Example 2 except Tinuvin™ 1130, a non-polymerizable benzotriazole UV absorber available from Ciba Specialty Chemicals was substituted for NORBLOC™ 7966. The product had IV=0.30 dl/g and a single Tg at 74° C.

What is claimed is:

1. A particle having a core/shell structure, wherein the core comprises a core polymer, which comprises the reaction product of a polymerizable ultraviolet absorber, and wherein the core polymer has a Tg less than 40° C.

2. The particle of claim 1 wherein the core polymer further comprises ethyl acrylate, which is reacted with said polymerizable ultraviolet absorber.

3. The particle of claim 1 wherein the core polymer further comprises a crosslinker, which is reacted with said polymerizable ultraviolet absorber.

4. The particle of claim 1 wherein the core further comprises an ultraviolet absorber dispersed within the core.

5. The particle of claim 1 wherein the shell comprises a shell polymer prepared from shell monomers chosen from the group consisting of ethyl acrylate, methyl methacrylate, and mixtures thereof.

6. The particle of claim 1 wherein the shell comprises a shell polymer, which comprises the reaction product of monomers comprising:
   from about 5 to 30 parts by weight ethyl acrylate and
   from about 70 to 95 parts by weight methyl methacrylate.

7. The particle of claim 1 wherein the particle comprises from about 10 to 50 parts by weight core, and from about 50 to 90 parts by weight shell.

8. A particle having a core/shell structure, wherein the core comprises a core polymer and an ultraviolet absorber and the shell comprises a shell polymer,
   wherein the core polymer comprises the reaction product of monomers consisting essentially of ethyl acrylate and (meth)acrylate-functional polymerizable ultraviolet absorber, and optional crosslinker, and
   wherein the shell polymer comprises the reaction product of shell monomers comprising monomers chosen from the group consisting of ethyl acrylate, methyl methacrylate, and mixtures thereof.

* * * * *

UNITED STATES PATENT AND TRADEMARK OFFICE
CERTIFICATE OF CORRECTION

PATENT NO.     : 6,312,807 B1                                                    Page 1 of 1
DATED          : November 6, 2001
INVENTOR(S)    : Ludwig, Bret W.

It is certified that error appears in the above-identified patent and that said Letters Patent is hereby corrected as shown below:

<u>Title page,</u>
Item [57], ABSTRACT,
Delete "a" and insert in place thereof -- an --.

<u>Column 4,</u>
Line 41, delete "(A:EA)" and insert in place thereof -- (MMA:EA) --.

Signed and Sealed this

Third Day of September, 2002

Attest:

Attesting Officer

JAMES E. ROGAN
Director of the United States Patent and Trademark Office